United States Patent [19]

Marek et al.

[11] 4,189,914

[45] Feb. 26, 1980

[54] SUPERCRITICAL FUEL INJECTION SYSTEM

[75] Inventors: Cecil J. Marek, Shaker Heights; Larry P. Cooper, Strongsville, both of Ohio

[73] Assignee: The United States of America as represented by the Administrator of the National Aeronautics and Space Administration, Washington, D.C.

[21] Appl. No.: 916,654

[22] Filed: Jun. 19, 1978

[51] Int. Cl.$^2$ .................................................. F02C 7/22
[52] U.S. Cl. ..................................... 60/726; 60/39.06; 261/28; 431/2; 60/737
[58] Field of Search .................... 60/39.74 R, 39.06; 261/28; 431/2

[56] References Cited

U.S. PATENT DOCUMENTS

| | | | |
|---|---|---|---|
| 3,581,493 | 6/1971 | Sweet | 60/39.74 R |
| 3,691,762 | 9/1972 | Ryberg | 60/39.74 R |
| 3,903,692 | 9/1975 | Croker | 60/39.74 R |
| 3,915,387 | 10/1975 | Caruel | 60/39.74 R |
| 3,971,210 | 7/1976 | Rose | 60/39.74 R |

*Primary Examiner*—Douglas Hart
*Attorney, Agent, or Firm*—N. T. Musial; J. R. Manning; G. E. Shook

[57] ABSTRACT

A fuel injection system is provided for gas turbines or the like which includes a pair of high pressure pumps which provide fuel and a carrier fluid such as air at pressures above the critical pressure of the fuel. A supercritical mixing chamber mixes the fuel and carrier fluid and the mixture is sprayed into a combustion chamber for burning therein. The use of fuel and a carrier fluid at supercritical pressures promotes rapid mixing of the fuel in the combustion chamber so as to reduce the formation of pollutants and promote cleaner burning.

7 Claims, 1 Drawing Figure

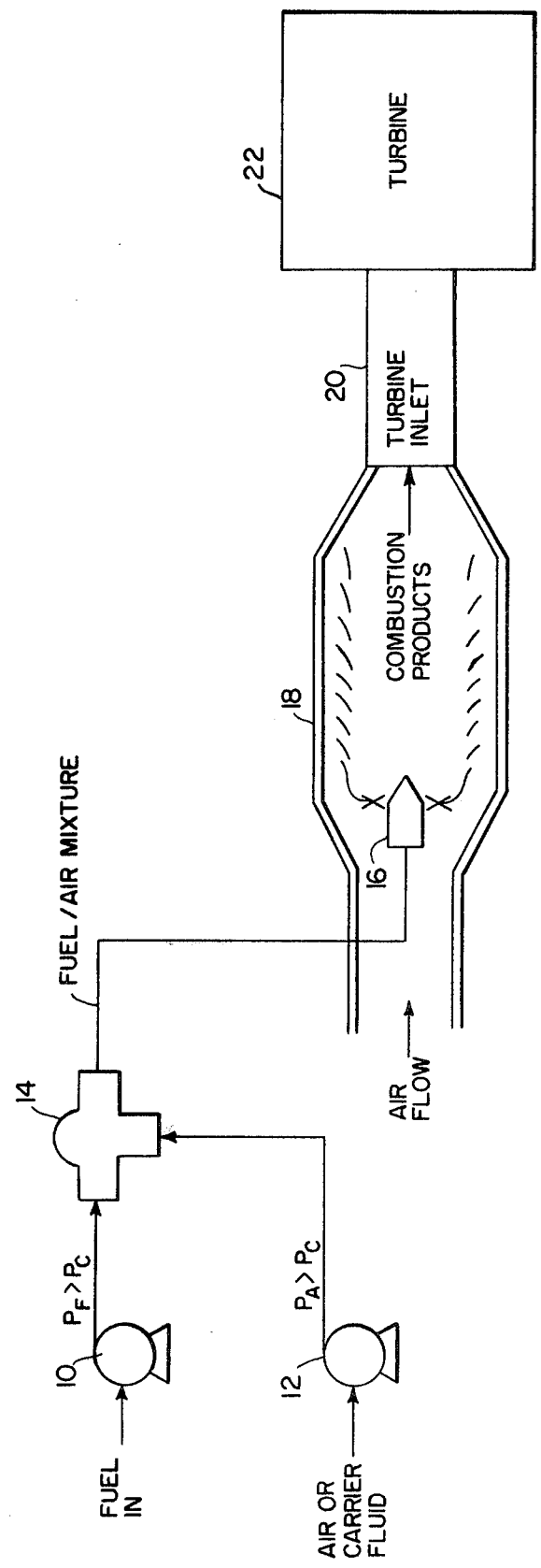

SUPERCRITICAL FUEL INJECTION SYSTEM

ORIGIN OF THE INVENTION

The invention described herein was made by employees of the United States Government and may be manufactured and used by or for the Government for governmental purposes without the payment of any royalties thereon or therefor.

FIELD OF THE INVENTION

The present invention relates to a fuel injection system for gas turbines and the like.

BACKGROUND OF THE INVENTION

With the ever increasing interest in both pollution control and fuel savings, a great deal of attention has been focussed on every aspect of the fuel combustion process. Fuel injection is one area of major interest and a number of different approaches have been taken. One problem of particular concern is the provision of rapid mixing of the fuel and air in the combustion chamber so as to promote cleaner burning and to prevent the formation of fuel rich pockets of the fuel/air mixture within the chamber. Two fuel injection techniques of particular interest here are the use of fuel injectors providing high pressure drops and/or the use of high air velocities (so-called "air blast" injectors) to create small droplets of fuel that will mix and evaporate rapidly.

A serious disadvantage associated with the use of high pressure drops is that the small orifice sizes which are required to produce such drops tend to clog. Further, with such high chamber pressures, mixing and penetration of the fuel is generally poor, resulting in smoke and the fuel rich pockets referred to above, and thus producing greater amounts of pollutants. In air blast injectors, the fuel must be distributed on a surface edge and this, again, requires small clearances to provide distribution of fuel and hence the same problems with regard to clogging and blockage are encountered.

A further discussion of the prior art and the problems associated with fuel injection in high performance gas turbines is contained in U.S. Pat. No. 3,283,502 (Lefebvre). Other patents of possible interest include U.S. Pat. Nos. 2,771,741 (Barnard 4th), 3,469,394 (Beheim), 3,961,475 (Wood) and 3,937,007 (Kappler), although this listing is not, and is not represented to be, exhaustive.

SUMMARY OF THE INVENTION

In accordance with the invention, a fuel injection system is provided which affords a number of important advantages as compared with prior art fuel injection systems. The invention enables mixing of a carrier fluid (such as air) with the fuel so that when the fuel is injected into a chamber at lower pressure, rapid breakup, mixing, dispersion and evaporation of the fuel occurs. Generally speaking, the invention concerns a system wherein fuel and a carrier fluid are mixed in a premix chamber at pressures above the critical pressure for the fuel, with the resulting mixture then being sprayed into a combustion space, such as a combustion chamber or the like, so that the pressure drop causes improved atomization of the mixture. The rapid breakup of the fuel which occurs upon release of the mixture into the combustion chamber results in a substantial increase in the evaporation and mixing of the fuel with the combustion air. This improved mixing reduces formation of pollutants such as carbon monoxides and nitrogen oxides ($NO_x$). In addition, the rapid combustion reduces the emission of unburned hydrocarbons and the amount of smoke formed in the combustion chamber is lessened. Further advantages accrue because of the additional volume of carrier fluid. Specifically, the fuel nozzle orifices can be larger and the higher velocities in the fuel passage will decrease the residence time and temperature rise of the fuel. Both of these features help prevent the clogging and gumming associated with prior art fuel injection systems.

According to a preferred embodiment thereof, the fuel injection system of the invention comprises means, such as a combustor, which define a combustion volume; means, preferably a high pressure pump, for supplying pressurized fuel at a pressure above the critical pressure of the fuel; means, preferably a further high pressure pump, for supplying a pressurized carrier fluid (such as air) at a pressure above the critical pressure of the fuel; a supercritical mixing chamber for mixing the pressurized fuel and carrier fluid to produce fuel/carrier fluid mixture; and means, such as a spray nozzle or nozzles, for supplying the fuel/carrier fluid mixture from said mixing chamber to the combustion space for combustion therein. The present invention is particularly adapted for use with high performance gas turbine engines for aircraft although the invention obviously has a considerably wider applicability.

Other features and advantages of the invention will be set forth in, or apparent from, the detailed description of the preferred embodiments found hereinbelow.

BRIEF DESCRIPTION OF THE DRAWINGS

The single FIGURE in the drawings is a schematic, largely block-form diagram of the fuel injection system of the invention.

DESCRIPTION OF THE PREFERRED EMBODIMENTS

Referring to the single FIGURE in the drawings, a highly schematic, partially block-form diagram of the fuel injection system of the invention as used with a gas turbine is shown. The system includes a high pressure fuel pump 10 and a high pressure air pump 12. Fuel pump 10 receives fuel from a fuel source (not shown) and pumps the fuel to a pressure above the critical pressure of the fuel. The critical pressure of a liquid is generally defined as the maximum pressure at which a fluid will form a liquid vapor interface. Above this pressure only one phase can exist. This critical pressure, which is denoted Pc in the drawings, is nominally 18 atmospheres or $18 \times 10^5$ N/m$^2$ for "Jet A" fuel. Pump 12 receives air or another suitable carrier fluid (hereinafter considered to be air), and, similarly to pump 10, pumps the air to a pressure greater than the critical pressure of the fuel Pc.

The fuel from pump 10 and the air from pump 12 are supplied to a supercritical mixing chamber 14 wherein the two are completely mixed so as to form a homogeneous single phase mixture. By maintaining the pressures in question, the mixture remains one phase and the fuel can mix without forming air bubbles.

The fuel-air mixture from mixing chamber 14 is passed through a suitable nozzle 16 into a conventional combustor or combustion chamber 18 wherein burning takes place. Upon release of the fuel/air mixture by nozzle 16, the air expands rapidly thereby rapidly breaking up and dispersing the fuel throughout the combustor 18. As noted above, this rapid breakup of the fuel results in much quicker evaporation and mixing of the fuel with the combustion air and thus promotes clean, complete burning. The increased mixing provided reduces pollutant formation of carbon monoxide and nitrogen oxides. Further, the small fuel particles formed lead to more rapid combustion and lower unburned hydrocarbon emission. In addition, less smoke is formed in the combustor 18 which also lowers pollution and decreases combustion liner heat transfer rates.

As discussed hereinabove, the provision of an additional volume of the carrier fluid enables the use of a fuel nozzle having a larger orifice thus making the nozzle less sensitive to clogging. Further, the additional volume of the carrier fluid produces higher velocities in the fuel passages which reduces the residence time and temperature rise of the fuel and results in less gumming and deposit formation in the nozzle.

The ratio of carrier fluid to fuel can be varied to maintain the total volume flow constant over the complete fuel flow range of the combustor from idle to takeoff. Good atomization occurs at low fuel flows improving idle performance and eliminating the need for duplex nozzles in some applications.

It will be appreciated that although the drawings show a single nozzle 16 and reference has been made to a single nozzle, plural nozzles, e.g., in the form of a fuel spray bar, can be used to inject the fuel/air mixture into the combustion chamber 18.

In the preferred emodiment illustrated, the output of the combustion chamber is applied to the turbine inlet 20 of a turbine 22 to drive the turbine. However, it will be understood that the invention is applicable to any device wherein almost instantaneous evaporation and mixing of the fuel with the surrounding gas is required or desirable.

Although the invention has been described relative to exemplary embodiments thereof, it will be understood that other variations and modifications can be effected in these embodiments without departing from the scope and spirit of the invention.

We claim:

1. A fuel injection system comprising means defining a combustion volume; means for supplying pressurized fuel at a pressure above the critical pressure thereof, means for supplying a pressurized carrier fluid at a pressure above the critical pressure of the fuel, mixing means for mixing said pressurized fuel and said pressurized carrier fluid to produce a fuel/carrier fluid mixture, and means for supplying said fuel/carrier fluid mixture to said combustion volume for combustion therein.

2. A fuel injection system as claimed in claim 1 wherein said means defining combustion volume comprises a combustor and the output of said combustor is supplied to the turbine inlet of a gas turbine.

3. A fuel injection system as claimed in claim 1 wherein said carrier fluid comprises air.

4. A fuel injection system as claimed in claim 1 wherein said fuel/air mixture supply means comprises at least one nozzle.

5. A fuel injection system as claimed in claim 1 wherein said means for supplying said pressurized fuel comprises a high pressure pump.

6. A fuel injection system as claimed in claim 1 wherein said means for supplying pressurized air comprises a high pressure pump.

7. A fuel injection system as claimed in claim 5 wherein said means for supplying said pressurized air comprises a high pressure pump.

* * * * *